(12) United States Patent
Hawtof et al.

(10) Patent No.: US 9,452,946 B2
(45) Date of Patent: Sep. 27, 2016

(54) LOCALLY-SINTERED POROUS SOOT PARTS AND METHODS OF FORMING

(71) Applicant: Corning Incorporated, Corning, NY (US)

(72) Inventors: Daniel Warren Hawtof, Corning, NY (US); Eric John Mozdy, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 135 days.

(21) Appl. No.: 14/057,329

(22) Filed: Oct. 18, 2013

(65) Prior Publication Data

US 2015/0111007 A1    Apr. 23, 2015

(51) Int. Cl.
*C03B 19/06* (2006.01)
*C03B 19/14* (2006.01)
*C03C 23/00* (2006.01)

(52) U.S. Cl.
CPC ........... *C03B 19/06* (2013.01); *C03B 19/1453* (2013.01); *C03B 19/1492* (2013.01); *C03C 23/0025* (2013.01); *Y10T 428/24777* (2015.01)

(58) Field of Classification Search
CPC .................................................... C03B 19/066
See application file for complete search history.

(56) References Cited

U.S. PATENT DOCUMENTS

| | | | |
|---|---|---|---|
| 3,806,570 A | 4/1974 | Flamenbaum et al. | 264/66 |
| 3,844,751 A | 10/1974 | Stewart | 65/4 |
| 4,082,526 A | 4/1978 | Estes et al. | 65/24 |
| 5,667,547 A | 9/1997 | Christiansen et al. | 65/17.4 |
| 5,922,100 A | 7/1999 | Cain et al. | 65/531 |
| 6,068,891 A | 5/2000 | O'Dell et al. | 427/555 |
| 6,207,603 B1 | 3/2001 | Danielson et al. | 501/64 |
| 6,263,706 B1 | 7/2001 | Deliso et al. | 65/397 |
| 6,606,883 B2 | 8/2003 | Hrdina et al. | 65/17.4 |
| 6,736,633 B1 | 5/2004 | Dawson-Elli et al. | 431/328 |
| 6,743,011 B2 | 6/2004 | Bakshi et al. | 431/328 |
| 6,837,076 B2 | 1/2005 | Hawtof | 65/413 |
| 7,299,657 B2 | 11/2007 | Kohli | 65/17.6 |
| 7,677,058 B2 | 3/2010 | Hawtof et al. | 65/17.4 |
| 8,062,733 B2 | 11/2011 | Hawtof et al. | |
| 8,181,485 B2 | 5/2012 | Coffey et al. | |
| 8,359,884 B2 | 1/2013 | Hawtof | |
| 2002/0151426 A1 | 10/2002 | Murata et al. | 501/66 |
| 2004/0007019 A1 | 1/2004 | Kohli | 65/17.6 |

(Continued)

FOREIGN PATENT DOCUMENTS

EP    0 476 693    12/1995
JP    09-286621    4/1997

OTHER PUBLICATIONS

"The Achille Heel of a Wonderful Material: Toughened Glass", www.glassonweb.com.

(Continued)

*Primary Examiner* — Bruce H Hess
*Assistant Examiner* — Christopher Polley
(74) *Attorney, Agent, or Firm* — Russell S. Magaziner (57) ABSTRACT

A porous soot sheet is formed using a roll-to-roll glass soot deposition and sintering process. The soot sheet formation involves depositing glass soot particles on a deposition surface to form a supported soot layer, removing the soot layer from the deposition surface to form a soot sheet, and heating a portion of the soot sheet to locally-sinter the glass soot particles and form a porous soot part having a sintered peripheral edge.

11 Claims, 7 Drawing Sheets

(56) References Cited

U.S. PATENT DOCUMENTS

| | | | |
|---|---|---|---|
| 2004/0089237 A1 | 5/2004 | Pruett et al. | 118/719 |
| 2004/0197575 A1 | 10/2004 | Bocko et al. | 428/432 |
| 2006/0063351 A1 | 3/2006 | Jain | 438/455 |
| 2007/0039353 A1 | 2/2007 | Kamiya | 65/30.14 |
| 2007/0160948 A1 | 7/2007 | Gartz | 432/146 |
| 2008/0280057 A1* | 11/2008 | Hawtof | C03B 19/1453 427/450 |
| 2010/0084016 A1 | 4/2010 | Aitken et al. | 136/258 |
| 2010/0124709 A1 | 5/2010 | Hawtof et al. | 430/5 |
| 2010/0279067 A1 | 11/2010 | Sabia et al. | 428/141 |
| 2010/0291346 A1 | 11/2010 | Hawtof et al. | 428/141 |
| 2010/0319401 A1* | 12/2010 | Coffey | C03B 19/1492 65/106 |
| 2011/0014445 A1 | 1/2011 | Hawtof | 428/220 |
| 2013/0095999 A1 | 4/2013 | Chaikittisilp et al. | 502/402 |

OTHER PUBLICATIONS

Tsai et al.; "Thermophoretic transport with application to external vapor deposition processes"; Int. J. Heat Mass Transfer., vol. 37, No. 2 (1994); pp. 257-268.

Tsai et al.; "A study of thermophoretic transport in a reacting flow with application to external chemical vapor deposition processes"; Int. J. Heat Mass Transfer., vol. 38, No. 10 (1995); pp. 1901-1910.

Tsai et al.; "A study of the thermophoretic transport and flame hydrolysis deposition with application to the manufacture of optical waveguides"; Journal of Materials Processing & Manufacturing Science, vol. 4 (Apr. 1996); pp. 299-321.

Tsai et al.; "Thermophoretic transport for a three-dimensional reacting flow impinging on a disk with burner misalignment"; Journal of Materials Processing & Manufacturing Science, vol. 3 (Jan. 1995); pp. 217-242.

* cited by examiner

LOCALLY-SINTERED POROUS SOOT PARTS AND METHODS OF FORMING

BACKGROUND

1. Field

The present disclosure relates generally to glass soot, and more specifically to a glass soot deposition and sintering process for forming mechanically robust, porous glass soot parts.

2. Technical Background

Glass soot particles are formed via gas-phase reactions and deposited onto a rotating drum to form a soot layer that is released from the drum to form a soot sheet. Disclosed herein are additional processes for forming partially-sintered soot parts from a soot sheet.

BRIEF SUMMARY

In accordance with embodiments of the present disclosure, a method for making a partially-sintered soot part comprises depositing glass soot particles on a deposition surface to form a soot layer, removing the soot layer from the deposition surface to form a soot sheet, and locally-heating a portion of the soot sheet to form a soot part comprising a porous soot body and a peripheral sintered glass edge.

The soot part includes a porous soot body, and a peripheral sintered glass edge surrounding the soot body. The sintered edge is formed as the soot part is cut from the soot sheet using, for example, a laser to affect localized heating of the soot.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in greater detail to various embodiments of the subject matter of the present disclosure, some embodiments of which are illustrated in the accompanying drawings. The same reference numerals will be used throughout the drawings to refer to the same or similar parts.

A partially-sintered soot part comprises a porous soot body, and a peripheral sintered glass edge that surrounds the soot body. The soot part is produced from a soot sheet by localized heating of the soot sheet, for example using a laser, which simultaneously cuts the soot sheet and forms a locally-sintered glass region that defines the soot part.

Figure 1:
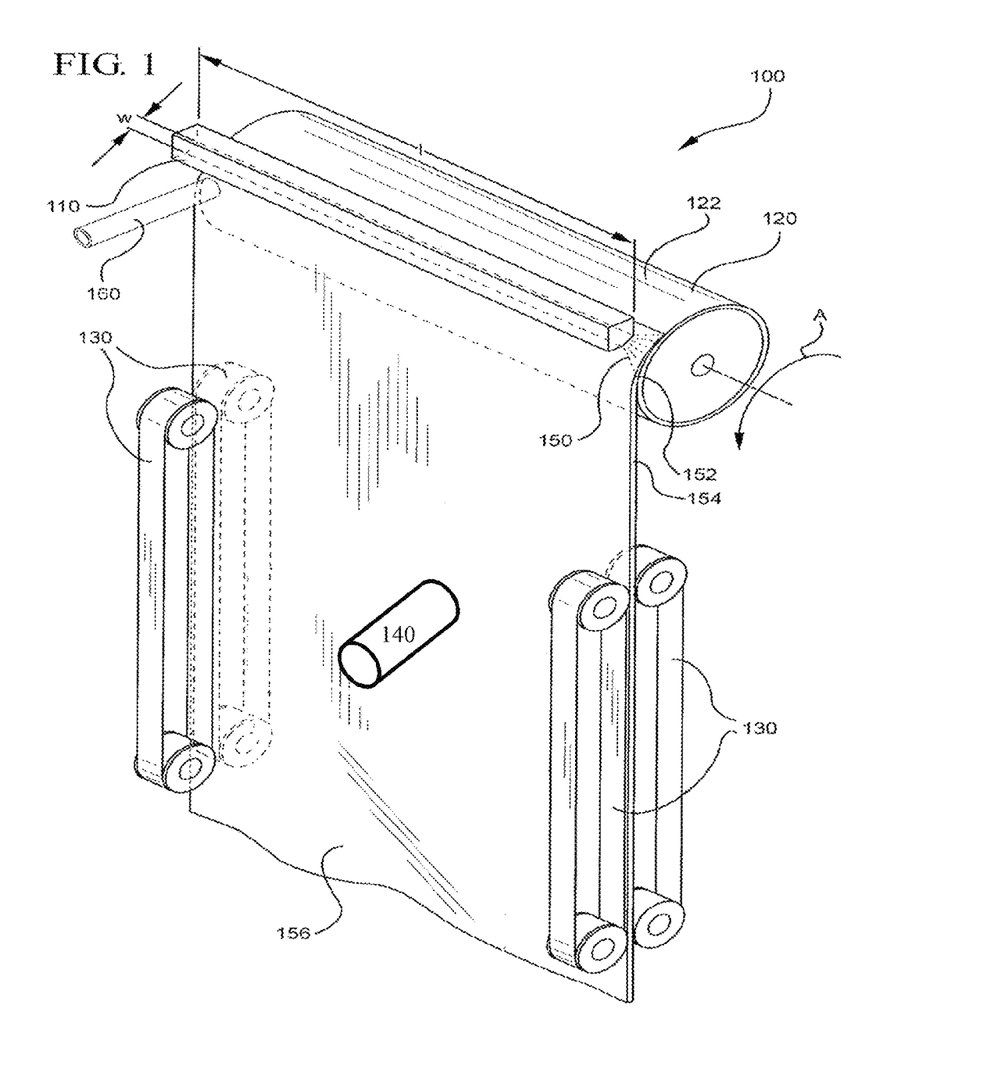
FIG. 1 is a schematic illustration of an apparatus for forming soot parts.

An example apparatus for forming a soot part is shown schematically in FIG. 1. The apparatus 100 comprises a soot-providing device 110, a soot-receiving device 120, a soot layer-separating device 160, a soot sheet-guiding device 130, and a soot cutting and sintering device 140.

Glass soot particles formed by the soot-providing device 110 are deposited on a deposition surface 122 of the soot-receiving device 120. The illustrated soot-receiving device 120 is in the form of a rotatable drum or belt. The soot-receiving device 120 includes a deposition surface 122. The deposition surface 122 may be continuous.

The deposited soot particles 150 form a soot layer 152 on the deposition surface 122. The soot layer 152 can be separated from the deposition surface 122 as a free-standing, continuous soot sheet 154. The act of separating the soot layer 152 from the deposition surface 122 can be aided by a soot layer-separating device 160.

After the soot sheet 154 is separated from the soot-receiving device 120, a soot sheet-guiding device 130 can guide movement of the soot sheet 154 to a soot sheet cutting and sintering device 140, which can segment the soot sheet into a soot part 600 by locally heating the soot sheet to form a sintered, dense glassy region that defines a peripheral portion of the soot part.

A process for making a soot part comprises depositing glass soot particles on a deposition surface to form a soot layer, removing the soot layer from the deposition surface to form a soot sheet, and locally-heating a portion of the soot sheet to form a soot part comprising a porous soot body and a peripheral sintered glass edge. Additional aspects of the process and apparatus are disclosed in detail herein below.

Although a variety of devices may be used to form glass soot particles, by way of example, the soot providing device 110 may comprise one or more flame hydrolysis burners, such as those used in outside vapor deposition (OVD), vapor axial deposition (VAD) and planar deposition processes.

Suitable burner configurations are disclosed in U.S. Pat. No. 6,606,883, 5,922,100, 6,837,076, 6,743,011 and 6,736,633, the contents of which are incorporated herein by reference in their entirety.

The soot-providing device 110 may comprise a single burner or multiple burners. An example burner has an output surface having length l and width w. The output surface comprises M rows and N columns of gas orifices where M and N can independently range from 1 to 20 or more. In an embodiment, each orifice comprises a 0.076 cm diameter hole. The orifices can be arranged in a square array having a 0.076 cm pitch between orifices. The length l of the output surface can range from about 2.5 to 30.5 cm or more, and the width can range from 0.1 to 7.5 cm. Optionally, multiple burners can be configured into a burner array that can produce a substantially continuous stream of soot particles over the length and width of the array.

A burner array, for example, may comprise a plurality of individual burners (e.g., placed end-to-end) configured to form and deposit a temporally and spatially uniform layer of glass soot. Thus, the soot-providing device 110 can be used to form a layer of soot 152 having a substantially homogeneous chemical composition and a substantially uniform thickness. By "uniform composition" and "uniform thickness" is meant that the composition and thickness variation over a given area is less than or equal to 20% of an average composition or thickness. In certain embodiments, one or both of the compositional and thickness variation of the soot sheet can be less than or equal to 10% of their respective average values over the soot sheet.

An example burner comprises 9 columns of gas orifices. During use, according to one embodiment, the centerline column (e.g., column 5) provides a silica gas precursor/carrier gas mixture. The immediately adjacent columns (e.g., columns 4 and 6) provide oxygen gas for stoichiometry control of the silica gas precursor. The next two columns on either side of the centerline (e.g., columns 2, 3, 7 and 8) provide additional oxygen, the flow rate of which can be used to control stoichiometry and soot density, and provide an oxidizer for the ignition flame. The outermost columns of orifices (e.g., columns 1 and 9) can provide an ignition flame mixture of, for example, $CH_4/O_2$ or $H_2/O_2$. Example gas flow rate ranges for a 9 column linear burner are disclosed in Table 1.

TABLE 1

Example gas flow rates for 9 column linear burner

| Gas | Burner column(s) | Example flow rate |
| --- | --- | --- |
| OMCTS | 5 | 15 g/min |
| $N_2$ | 5 | 40 SLPM |
| $O_2$ | 4, 6 | 18 SLPM |
| $O_2$ | 2, 3, 7, 8 | 36 SLPM |
| $CH_4$ | 1, 9 | 36 SLPM |
| $O_2$ | 1, 9 | 30 SLPM |

The soot-providing device may be held stationery during formation and deposition of the soot particles or, alternatively, the soot-providing device may be moved (e.g., oscillated) with respect to the deposition surface. A distance from the burner output surface to the deposition surface can range from about 20 mm to 100 mm (e.g., 20, 25, 30, 35, 40, 45, 50, 55, 60, 65, 70, 75, 80, 85, 90, 95 or 100 mm).

Operation of the soot-providing device typically involves chemical reactions between precursor chemicals (e.g., gaseous compounds) to form glass soot particles. Optionally, the chemical reactions can be further assisted by supplemental energy sources such as plasma or a supplemental heating device.

Silicon-containing precursor compounds, for example, can be used to form soot sheets comprising silica soot particles. An example silica gas precursor is octamethylcyclotetrasiloxane (OMCTS). OMCTS can be introduced into a burner or burner array together with $H_2$, $O_2$, $CH_4$ or other fuels where it is oxidized and hydrolyzed to produce silica soot particles. Although the process of forming a soot sheet typically comprises forming a high-silica soot sheet, the process and apparatus can be used to form other soot sheet materials as well.

As-produced or as-deposited, the soot particles may comprise or consist essentially of a single phase (e.g., a single oxide) such as in the example of un-doped, high-purity silica glass. Alternatively, the soot particles may comprise two or more components or two or more phases, such as in the example of doped silica glass. For instance, multiphase high-silica soot sheets can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

In the example of a flame hydrolysis burner, doping can take place in situ during the flame hydrolysis process by introducing dopant precursors into the flame. In a further example, such as in the case of a plasma-heated soot sprayer, soot particles sprayed from the soot-providing device can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements.

The soot particles can have an essentially homogeneous composition, size and/or shape. Alternatively, one or more of the composition, size and shape of the soot particles can vary. For example, soot particles of a main glass component can be provided by a first soot-providing device, while soot particles of a dopant composition can be provided by a second soot-providing device. In certain embodiments, soot particles can mix and/or adhere to one another during the acts of forming and depositing the soot particles to form composite particles. It is also possible that the soot particles are substantially prevented from adhering to each other to form mixed particles prior to or while being deposited on the deposition surface.

Referring still to FIG. 1, deposition surface 122 comprises a peripheral portion of the soot-receiving device 120 and can be formed of a refractory material. In an embodiment, the deposition surface 122 is formed of a material that is chemically and thermally compatible with both the soot particles 150 and the deposited soot layer 152, and from which the soot layer can be removed. Example soot-receiving devices 120 comprise a coating or cladding of a refractory material (e.g., silica, silicon carbide, graphite, zirconia, etc.) formed over a core material of, for example, steel, aluminum or metal alloy. Further soot-receiving devices can comprise a unitary part consisting essentially of a suitable refractory material such as quartz.

The soot-receiving device 120 and particularly the deposition surface 122 can be configured in a variety of different ways and have a variety of shapes and/or dimensions. For example, a width of the deposition surface can range from about 2 cm to 2 m, although smaller and larger dimensions are possible. A cross-sectional shape of the soot-receiving device 120 can be circular, oval, elliptical, triangular, square, hexagonal, etc., and a corresponding cross-sectional dimension (e.g., diameter or length) of the soot-receiving device 120 can also vary. For example, a diameter of a soot-receiving device having a circular cross section can range from about 2 cm to 50 cm. An example soot-receiving device 120 comprises a quartz cylinder having a 250 mm inner diameter, a 260 mm outer diameter, and a 24 cm wide deposition surface.

In the examples of circular or oval cross-sections, the deposition surface 122 can comprise a closed, continuous surface, while in the examples of elliptical, triangular, square or hexagonal cross-sections, the deposition surface can comprise a segmented surface. By appropriately selecting the size and dimensions of the soot-receiving device 120, a continuous or semi-continuous soot sheet can be formed.

The deposition surface 122 can include regular or irregular patterning in the form of raised or lowered protrusions across a range of length scales. The patterning can range from one or more discrete facets to a general roughing of the surface. A deposited soot layer can conform to the patterning in the deposition surface. The pattern formed in the soot surface can be retained in the deposited surface of the soot sheet as it is separated from the deposition surface. In a variation of the above-described deposition surface-derived embossing, one or both of the deposited surface and the free surface of a soot sheet can be patterned after it is removed from the deposition surface but prior to sintering. For example, Applicants have patterned a soot sheet surface with a fingerprint.

In certain embodiments, the soot-receiving device 120 is rotated during the act of depositing soot particles 150 in order to form a soot layer 152 thereon. The rotation can be unidirectional, e.g., clockwise or counter-clockwise. A direction of rotation according to one embodiment is indicated by arrow A in FIG. 1. Optionally, the soot-receiving device may oscillate during the soot deposition process, i.e., the rotation direction may change intermittently. A linear velocity of the deposition surface 122 of the soot-receiving device 120 can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 msec or higher.

Soot particles 150 are typically deposited on only a portion of the deposition surface 122 (i.e., within a deposition zone), and the deposited soot layer 152 is separated to form a free-standing continuous or semi-continuous soot sheet 154 having a finite length. As illustrated in FIG. 1, a width of the deposited layer 152 (and nominally of the soot sheet 154) is 1. A width of the deposition surface 122 of the soot-receiving device 120 can be greater than, approximately equal to, or less than a corresponding length of the output surface of the burner.

In certain embodiments, the soot layer can be continuously formed on and continuously separated from the deposition surface. During formation of a soot layer, soot particles bond to a certain degree with each other and with the deposition surface. The higher the average temperature of the soot particles when they are being deposited, the more likely they are to bond with each other and form a partially dense and mechanically robust soot sheet. However, higher deposition temperatures also promote bonding between the soot particles and the deposition surface, which can interfere with releasing of the soot sheet. To obtain a substantially uniform temperature across the deposition surface, the soot-receiving device can be heated or cooled either from the inside, the outside, or both.

Bonding between soot particle and the deposition surface can be controlled by controlling a temperature gradient between a location where the soot particles are deposited and a location where the soot layer is released to form a soot sheet. For instance, if the soot layer and the deposition surface have sufficiently different coefficients of thermal expansion (CTEs), the release may occur spontaneously due to stress caused by the temperature gradient. In certain embodiments, removal of the deposited soot layer from the deposition surface can be made easier by forming a soot layer having a width that is less than the width of the deposition surface 122.

Composite soot layer comprising plural layers of soot may be formed by depositing, for example, a second soot layer onto a previously-formed initial soot layer. Such can be sued to form a soot body that comprises a composite of at least two soot layers. The plural soot layers in a composite soot layer may have different respective chemical compositions, for example a doped (e.g., Ti- or B-doped) silica layer formed on an un-doped silica layer.

During the act of separating the soot layer from the deposition surface, a direction of motion of the separated soot sheet can be substantially tangential to a release point on the deposition surface. By "substantially tangential" is meant that the direction of motion of the soot sheet relative to a release point on the deposition surface deviates by less than about 10 degrees (e.g., less than 10, 5, 2 or 1 degrees) from a direction that is tangential to the deposition surface at the release point. Maintaining a substantially tangential release angle can reduce the stress exerted on the soot sheet at the release point.

For a soot-receiving device having a circular or oval cross section, the curvature of the deposition surface is a function of the cross-sectional diameter(s) of the soot-receiving device. As the diameter increases, the radius of curvature increases, and stresses in the deposited soot decrease as the shape of the deposited soot sheet approaches that of a flat, planar sheet.

In embodiments, the soot sheet has sufficient mechanical integrity to support its own mass (i.e., during the acts of removal from the deposition surface, handling and sintering) without fracturing or tearing. Process variables that can affect the physical and mechanical properties of the soot sheet include, inter alia, the thickness and density of the soot sheet, the curvature of the deposition surface, and the temperature of the soot sheet during formation and removal from the deposition surface.

A soot sheet 154 comprises two major surfaces, only one of which contacts the deposition surface 122 during formation of the soot layer 152. Thus, the two major surfaces of the soot sheet may be characterized and distinguished as the "deposited surface," and the opposing "free surface."

A soot layer-separating device 160 can be used to separate the soot layer from the deposition surface. In embodiments, the soot layer-separating device 160 is configured to bring a stream of gas into contact with at least a portion of the free surface of the soot layer. Without wishing to be bound by theory, it is believed that the impinging gas stream affects local thermal expansion stresses at the soot layer/deposition surface interface and, in the region of the soot layer where the gas stream is directed, the soot layer can be more easily separated from the underlying deposition surface.

Unlike a conventional air knife, which would direct a gas jet at the deposited surface of the soot in order to force the soot layer away from the deposition surface, the soot layer-separating device directs a gas stream onto the free surface of the deposited soot layer. An air knife directed at the deposited surface of the soot would be unable to impinge the soot layer prior to its separation from the deposition surface. Further, in contrast to the disclosed method, and particularly for very thin soot sheets, impingement of a gas stream on the deposited surface of the soot sheet could tear or fracture the soot.

The soot layer-separating device may comprise a single gas output or multiple outputs. One example soot layer-separating device comprises a tube having an open end configured to provide a gas flow there-through. A further example of a soot layer-separating device comprises a showerhead having a plurality of openings through which gas can flow.

Figure 2:
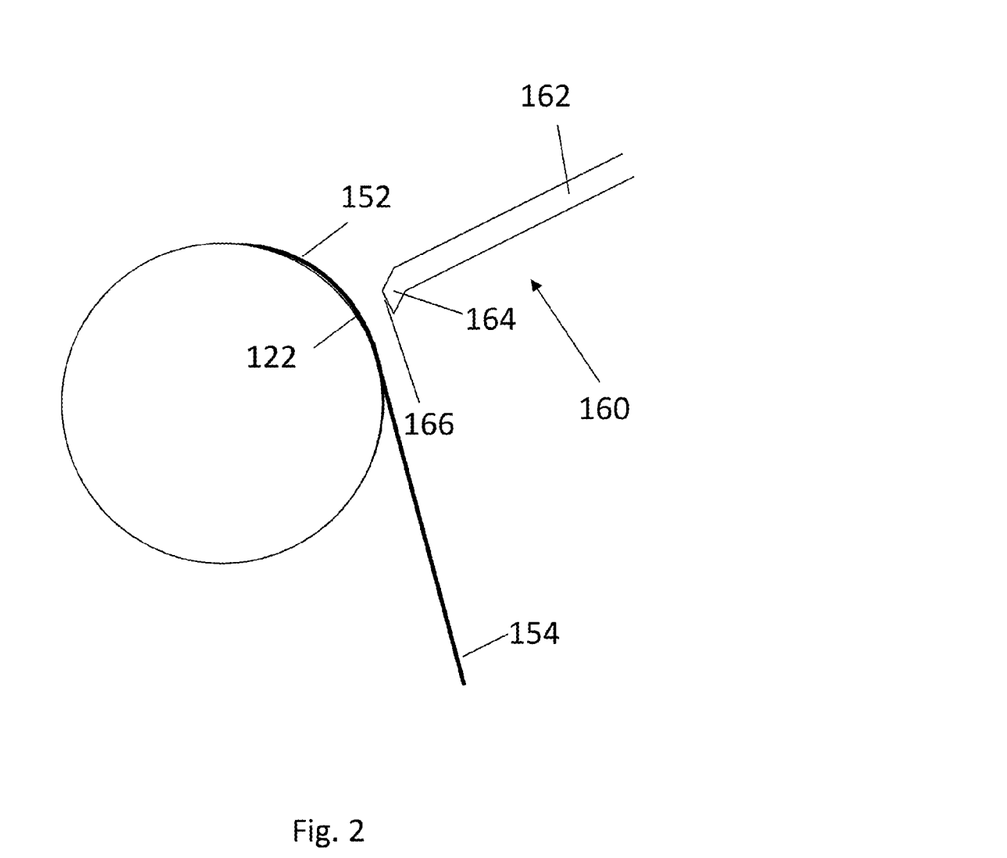
FIG. 2 is an example configuration of a soot layer-separating device.

An example configuration of a soot layer-separating device is illustrated in FIG. 2, which shows a cross-sectional schematic of soot layer-separating device 160 positioned proximate to deposition surface 122 and deposited soot layer 152. The soot layer-separating device 160 includes a gas conduit 162 having a gas nozzle 164. A gas conduit can comprise a tube such as a stainless steel tube having any suitable dimensions. An example tube can have a cross-sectional diameter ranging from about 0.125 to 1 inch. Example dimensions are shown in units of inches.

As shown in FIG. 2, nozzle 164 having gas outlet 166 is oriented at an angle $\Phi$ with respect to the deposition surface normal. The nozzle 164 and gas outlet 166 can be oriented such that an incident angle of the gas stream upon the soot ranges from 0° (i.e., normal incidence) to nearly 90°. Example incident angles $\Phi$ include 0, 10, 20, 30, 40, 50, 60, 70 and 80°±5°.

An areal profile of the gas stream may be symmetric or asymmetric and may be directed at any suitable combination of a center region or one or more edge regions of the soot layer. Thus, the impingement of a gas stream may be localized with respect to a width of the soot layer as well as a length. By localized is meant that the gas stream impinges one area of the soot layer to the exclusion of other areas. FIGS. 3A-3D illustrate exemplary gas stream distribution profiles, which show the gas stream impact zone 170 with respect to the soot layer 152 and soot sheet 154.

Figures 3, 3A:
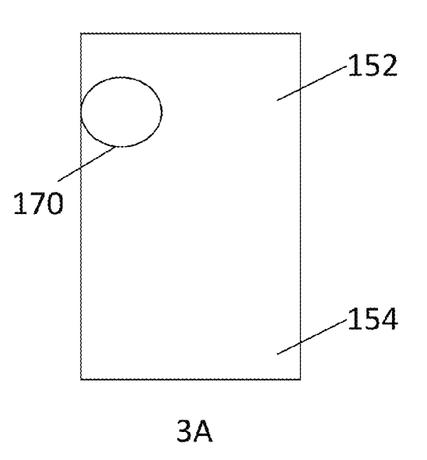
FIGS. 3A-3D illustrate gas stream configurations according to various embodiments.

In FIG. 3A, the gas stream is directed only at the left edge of the soot layer. Although not illustrated, it will be appreciated that a gas stream could alternatively be directed at the center of the soot layer or at the right edge.

Figures 3, 3B:
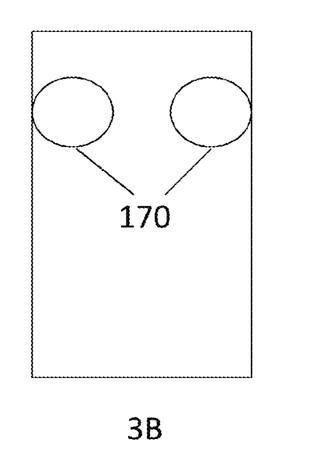

In FIG. 3B, the gas stream is directed both at the left edge and the center region of the soot layer. According to non-illustrated embodiments, a gas stream could be directed simultaneously at the center region and right edge, at the left and right edges, or across an entire width of the soot layer.

Figures 3, 3C:
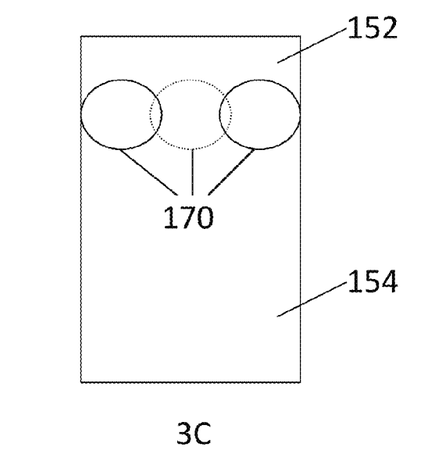

In FIG. 3C, the gas stream is directed across the entire width of the soot layer. However, in the illustrated embodiment, the gas flow rate at the edges is greater than a gas flow rate at the center region. A dotted line for the gas stream impact zone 170 is used to indicate the lower flow rate at the center region.

Figures 3, 3D:
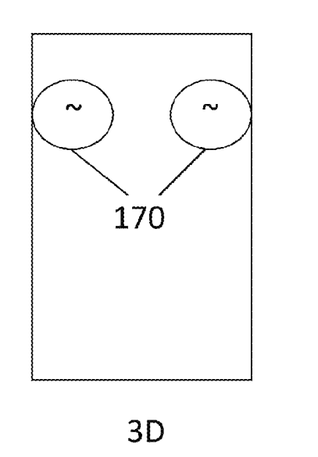

Finally, in FIG. 3D, a pulsed gas stream is directed at the edges of the soot layer. A tilde ($\sim$) within the gas stream impact zone 170 is used to indicate a variable flow rate at the edges in FIG. 3D. As suggested by the gas stream distributions shown in FIGS. 3A-3D, it will be appreciated that various permutations and combinations of gas flow rates may be selected in order to promote separation of the soot layer from the deposition surface.

The gas stream may be temporally or spatially continuous or discontinuous. For instance, a gas stream having a constant flow rate may impinge a portion of the free surface of the soot layer, such as an edge portion of the soot layer. In an embodiment, the soot layer-separating device is configured to deliver a gas stream to an area of the deposited soot layer downstream of the deposition zone. As a further example, the gas stream can have a variable gas flow rate, e.g., a pulsed stream. The flow rate of the gas stream can be controlled using a suitable controller such as a needle valve, rotometer or mass flow meter. In exemplary embodiments, the gas stream flow rate can range from 0.1 to 10 m/sec.

The gas that impinges the surface of the soot can be a single gas composition or a gas mixture and can include elemental gases and/or compounds such as helium, nitrogen, oxygen, argon, forming gas, carbon monoxide and carbon dioxide. In addition, solid or liquid particles can be entrained in the gas stream such that the gas stream comprises a gaseous suspension of solid and/or liquid particles (e.g., an aerosol). It is believed that impingement of the gas stream on the free surface of the soot reduces a temperature of the soot, which can promote separation of the soot layer from the deposition surface. A temperature of the gas stream can be controlled. The gas stream can be heated or cooled prior to impinging on the surface of the soot. Example temperatures of the gas stream range from 0° C. to 200° C. (e.g., 0, 10, 20, 50, 100, 150 or 200° C.).

Additional aspects of a suitable soot layer-separating device, including particular dimensions of the device, its orientation or positioning with respect to the soot layer to be separated, and the composition and nature of the gas stream can be readily selected by a skilled artisan. Particular features, though not intended to be limiting, are disclosed herein.

Figure 4:
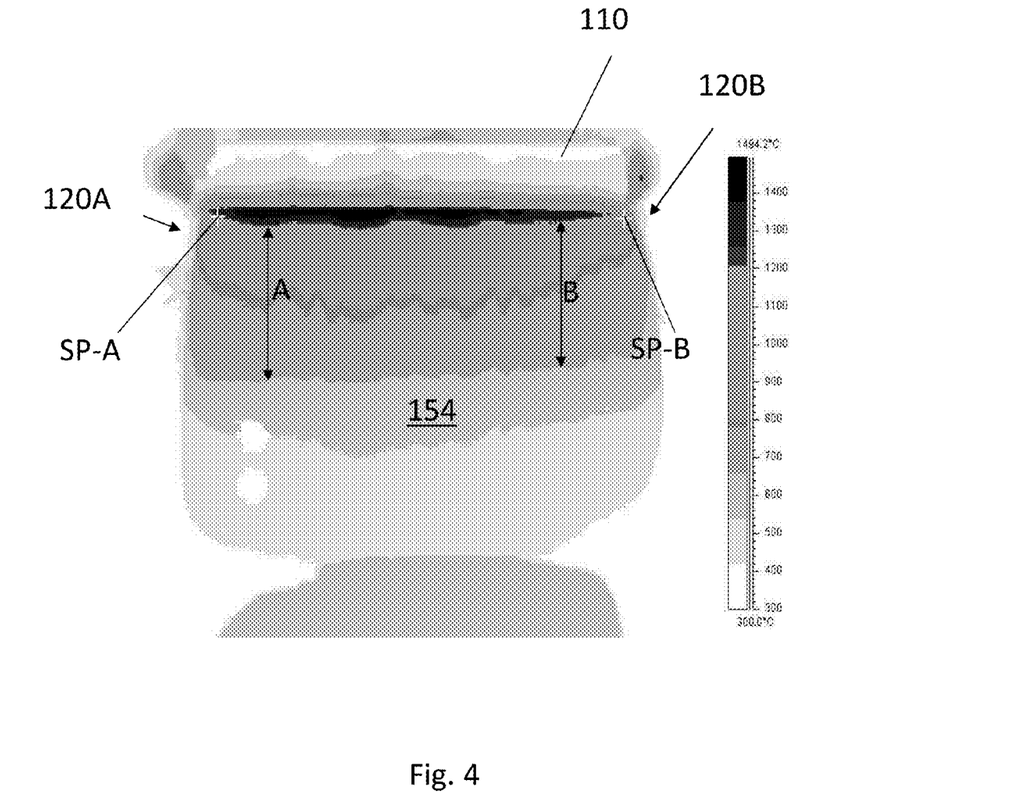
FIG. 4 is thermal imaging data for a glass soot sheet without use of a soot layer-separating device.
Figure 5:
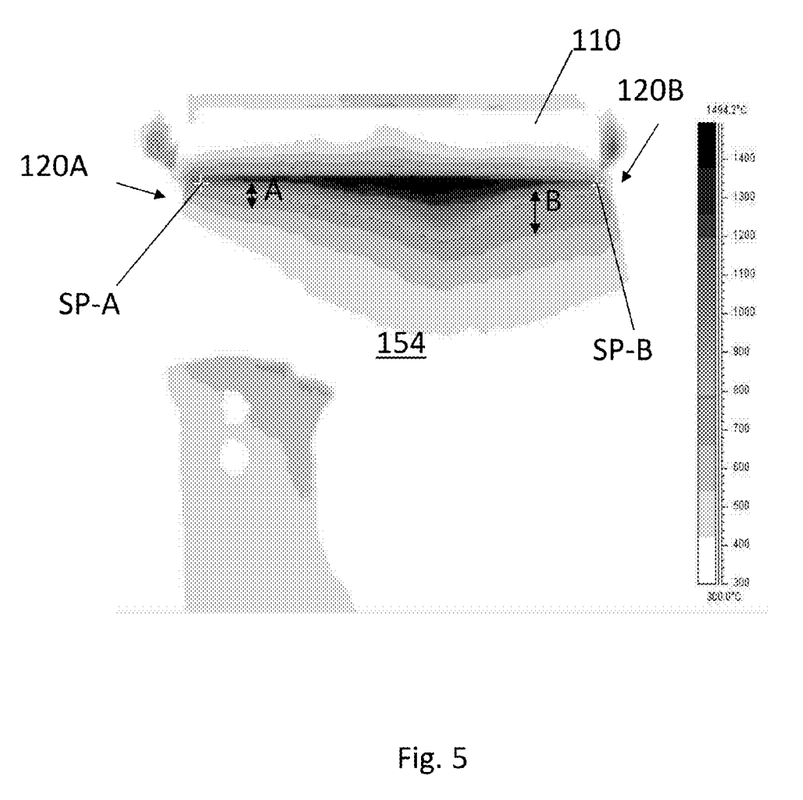
FIG. 5 is thermal imaging data for a glass soot sheet when a soot layer-separating device is used.

In a series of experiments, a FLIR S65 thermal imaging camera was used to measure a temperature profile of the glass soot both at and downstream of the deposition zone. A software package, ThermaCAM Researcher Professional 2.8 SR-1, was used to analyze the thermal imaging data. Thermal imaging data shown in FIGS. 4 and 5 depicts various isothermal regions associated with the apparatus and the deposited soot during formation of the soot layer and separation of the soot layer from the deposition surface. FIG. 4 shows thermal imaging data where a soot layer-separating device was not used, while FIG. 5 shows thermal imaging data according to an embodiment where a soot layer-separating device was used to direct a gas stream over a portion of the free surface of the deposited soot layer.

In FIGS. 4 and 5, a rectangular-shaped soot providing device 110 (e.g., a 9-column burner) is located near the top of each image. The back face of the soot providing device 110 is at a temperature of about 300° C. and, together with the background, appears lightest.

In the plan views of FIGS. 4 and 5, the soot receiving device 120 and the corresponding deposition surface 122 are located behind and below the soot providing device 110. The deposition zone is located below the soot providing device 110 and is associated with the highest temperatures. Left and right edges 120A, 120B, respectively, of the soot receiving device 120 extend beyond the soot providing device 110, while the attached soot layer 152 and released soot sheet 154 are shown extending below the soot providing device 110 into the lower portion of each image.

Under the deposition conditions corresponding to FIG. 4 (no gas stream), the soot layer adheres to the deposition surface resulting in catastrophic tearing of the soot sheet. The adhesion was observed particularly near the left edge 120A of the deposition zone. With reference to FIG. 4, it is clear from the thermal imaging that there is larger area of soot having a temperature in the 400° C.-1200° C. range on the left side of the sheet than on the right side. By employing a soot layer-separating device in the higher temperature region, the sticking was eliminated and a pristine soot sheet was produced.

The contribution of the gas stream to the temperature profile of the soot sheet is evident by comparing the thermal imaging data of FIG. 4 and FIG. 5. With reference to the left and right edges of each sheet, a dimension across a region having a temperature within the 800° C. to 1200° C. temperature band is indicated by arrows A and B. Impingement of the gas stream decreases a temperature of the soot in the region where the gas stream is applied, which facilitates separation of the soot layer from the deposition surface.

In addition to the thermal imaging data, which shows the temperature profile across the soot layer 152 and the soot sheet 154, localized temperature measurements were made near left and right edges 120A, 120B at points SP-A and SP-B, which are located slightly below the deposition zone and demarcated in FIGS. 4 and 5 by a cross (+). Temperature data from points SP-A and SP-B are summarized in Table 2 for successive deposition runs. Three sets of temperature data are shown for deposition conditions corresponding to no soot layer-separating device (FIG. 4) and a soot layer-separating device focused at the left edge 120A of the soot receiving device 120 (FIG. 5).

TABLE 2

Soot layer temperature at left and right edges during deposition

| | No gas stream | | | Focused gas stream | |
| --- | --- | --- | --- | --- | --- |
| | SP-A | SP-B | | SP-A | SP-B |
| Run 1 | 1213° C. | 1058° C. | Run 4 | 1205° C. | 1059° C. |
| Run 2 | 1235° C. | 1067° C. | Run 5 | 997° C. | 924° C. |
| Run 3 | 1189° C. | 1061° C. | Run 6 | 1023° C. | 1043° C. |
| Ave. (1-3) | 1212° C. | 1062° C. | Ave. (4-6) | 1075° C. | 1009° C. |
| | $\Delta \overline{T}_{SPA-SPB}$ = 150° C. | | | $\Delta \overline{T}_{SPA-SPB}$ = 66° C. | |

As seen with reference to Table 2, by using the soot layer-separating device to direct a focused gas stream near the left edge, an average temperature at the left edge of the soot sheet was decreased by 137° C., while an average temperature at the left edge of the soot sheet was decreased by 53° C. Stated another way, the temperature gradient between the left and right edges of the deposition surface was decreased. Prior to using the soot layer-separating device, the average temperature difference between the left and right edges was 150° C., compared to only 66° C. when a gas stream was focused near point SP-A.

In an example of a soot sheet comprising at least 90 mole % silica, an average soot density of the soot sheet can range from about 0.2 to 1.8 g/cm$^3$, e.g., from about 0.4 to 1.5 g/cm$^3$, or from about 0.8 to 1.2 g/cm$^3$, and an average thickness of the soot sheet can range from 10 to 600 μm, e.g., 20 to 200 μm, 50 to 100 μm or 300 to 500 μm.

In certain embodiments, particularly those involving continuous soot sheet production, continuous movement of the soot sheet 154 away from the deposition surface after its release can be aided by a soot sheet guiding device 130. The soot sheet guiding device 130 can directly contact at least a portion of the soot sheet 154 in order to aid movement and provide mechanical support for the soot sheet.

To maintain a high surface quality of the soot sheet, the soot sheet guiding device 130 may contact only portions (e.g., edge portions) of the soot sheet 154. Specifically, the soot sheet guiding device can contact opposing edge portions of the soot sheet and apply a tensile stress across the soot sheet during further processing.

After the soot sheet is formed, it may be further processed, for example, using a laser, to produce a high-value soot part having at least one sintered edge. The additional processing may include laser processing that cuts a near-net-shape (or actual shape) part from the soot sheet and, in the process of cutting, locally-sinters the soot along the cut interface. Any laser useful in the methods described herein may be used.

The thus formed soot part includes a porous soot body and a peripheral sintered glass edge. In example embodiments, the soot body is 20 to 80% dense while the sintered edge is at least 80% (e.g., 80, 95, 90 or 95%) dense. For a high-silica soot part, the density of the porous soot body may range from 0.2 to 1.76 g/cm$^3$, while the density of the sintered edge may range from 1.76 to 2.2 g/cm$^3$.

A soot part is essentially a 2-dimensional shape having an area and a thickness, where the thickness dimension is substantially orthogonal to the areal dimension. The areal shape of example soot parts may be circular, oval, square, rectangular, etc. According to embodiments, for example, a donut-shaped soot part may be formed. In such a soot part, a porous soot body is bounded by an outer peripheral sintered glass edge and heating means (such as a laser) is additionally used to form a void within the soot part and an attendant inner sintered glass edge. According to still further embodiments, the soot body of a soot part may include a dense, sintered region formed within the soot body, e.g., without the formation of a void.

Figure 6:
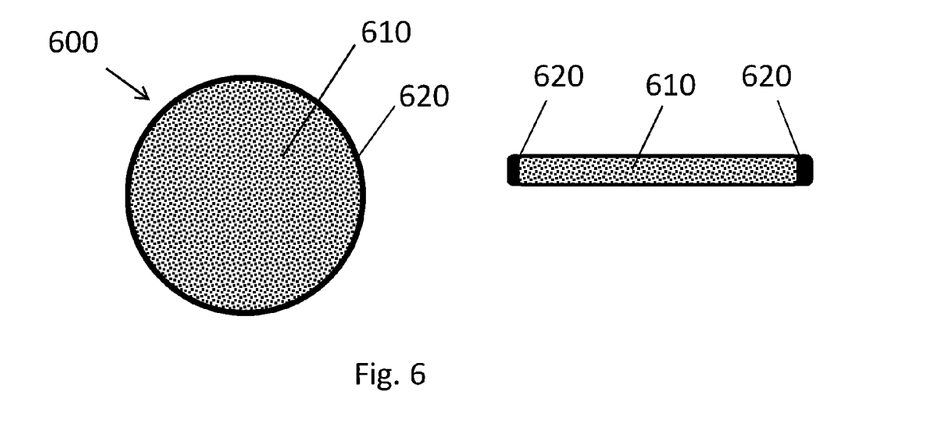
FIG. 6 is a schematic diagram of a circular soot part.

A schematic diagram showing a plan view and a cross-sectional view of a soot part according to embodiments is shown in FIG. 6. The soot part 600 includes a porous soot body 610 and a sintered edge 620. In the illustrated plan view, the soot body has a circular shape and, as seen in the cross-sectional view, a rectangular cross-section. In embodiments, a cross-sectional shape of the sintered edge may be parabolic.

Figure 7:
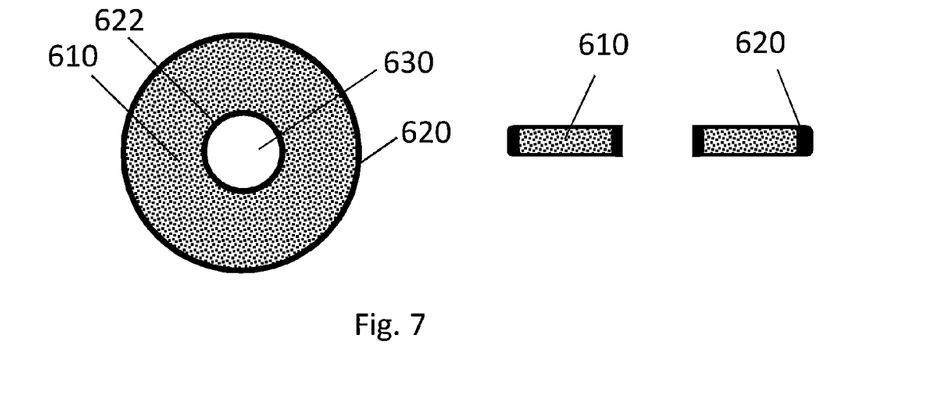
FIG. 7 is a schematic diagram of a soot part including an inner sintered edge.

A schematic diagram of a soot part according to further embodiments is shown in FIG. 7. The soot part 600 includes a porous soot body 610, an outer sintered edge 620 and inner sintered edge 622 defining void 630.

Figure 8:
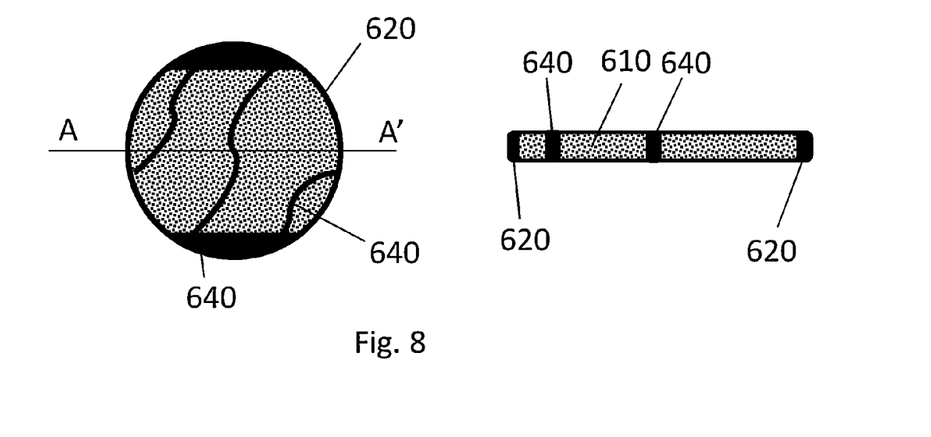
FIG. 8 is a schematic diagram of a soot part including sintered glass regions within the soot body.

A schematic diagram of a soot part according to further embodiments is shown in FIG. 8. The soot part 600 includes a porous soot body 610, a sintered edge 620 and locally-sintered regions 640 within the soot body.

Sintered regions, including sintered edges and internal sintered regions may have a uniform density or comprise a density gradient. For example, the density of the sintered soot across a width of a sintered edge may decrease proximate to the unsintered soot body. In embodiments, the glass edge width may range from 0.5 to 5 mm, e.g., 0.5, 1, 2, or 5 mm.

As a non-limiting example, a silica soot sheet may be cut using a $CO_2$ laser (Synrad Model #48-2KAL, 25 Watt operated using a Synrad VC-2000 laser controller). Example $CO_2$ lasers have a operating wavelength of about 10.2 to 10.8 μm and a repetition rate of about 5 kHz. A cutting speed can range from 1 to 10 mm/sec. Further examples of suitable lasers that may be used include, but are not limited to, a picosecond laser operating at 355 nm laser wavelength, with a repetition rate of 1 MHz; a femtosecond laser operating at a wavelength of 1560 nm, 10 μJ pulse energy, 1 MHz repetition rate, and pulse duration of less than 700 fs; and a nanosecond 355 nm laser, operating at 100 kHz.

The soot sheet can be placed on an appropriate support and cut to the desired final dimensions with the laser. An example support can grip the soot sheet during the cutting using, for example, a vacuum chuck. In embodiments, during the cutting the support can maintain the flatness of the soot sheet. The support can be made from a non-reflective material such as graphite. During the acts of cutting and sintering, the soot sheet may be held stationery, or moved continuously or semi-continuously. A linear velocity of the soot sheet (or laser) can range from 0.1 mm/sec to 10 mm/sec (e.g., 0.1, 0.2, 0.5, 1, 2, 3, 4, 5 or 10 mm/sec). Cutting and sintering may be performed via one or more passes through the cutting/sintering zone using the same or different laser conditions.

The number of passes made by the laser may vary depending on, for example, the thickness and other properties of the soot sheet and the parameters of the laser, and can easily be determined by those of skill in the art. For example, a high-silica soot sheet having a thickness of about 500 μm may require 2 or more passes to cut completely through the sheet.

It may be desirable, in certain embodiments, to employ one or more than one form of motion during the cutting and sintering processes. For example, the laser, the support holding the soot sheet, or both may be staged for the process. By way of non-limiting example, depending on the laser repetition rate chosen, multiple-pass laser cutting and sintering may involve moving the soot sheet relative to the laser beam at a speed which is much higher than the effective cutting speed. The relative motion of the soot sheet with respect to the laser beam may optionally be achieved with mechanical stages (mechanical scanning, involving motion by the support), by scanning the laser beam with an optical scanning device such as a galvanometer (optical scanning, which may use light-weight mirrors mounted on a motor), or some combination thereof. In at least certain exemplary embodiments, optical scanning may be preferred at high speed cutting operations because it enables uniform cutting at tight corner radius.

The soot sheet may be pre-cut prior to the cutting/sintering steps. For example, a laser can be used to cut the soot sheet into smaller pieces to simplify handling. The methods disclosed herein may be used to form an un-supported soot part. Such a soot part is free-standing. An air table may be used to manipulate the soot sheet and the soot part with minimal contact.

It has been found that using a laser to define the soot part may give the soot part a physical appearance and other characteristics similar to those associated with a melt-derived glass edge without actually melting the material. This is of particular interest for certain applications, because such an edge is believed to impart improved physical properties, such as, for example, improved mechanical strength, density, and hermeticity, while providing an edge that is substantially flat, wrinkle-free, thin, and pore-free relative to the uncut soot sheet. The laser-processed edge comprises a densified, glassy region.

As used herein, sintering refers to a process whereby glass soot particles are heated (e.g., with a laser) below their melting point (solid state sintering) until they adhere to each other. During laser cutting, some liquid phase sintering may take place, which contributes to the formation of a thin, smooth edge. Annealing is a process of heating and cooling glass to relieve internal stresses after it was formed. Sintering and annealing can be carried out sequentially using the same or different apparatus. A sintered region is rigid or semi-rigid.

Though a sintering temperature can be selected by skilled artisan based on, for example, the composition of the soot sheet, a sintering temperature can range from about 1000° C. to 1600° C. For example, a local temperature for cutting and sintering may range from about 1400° C. to 2500° C.

In addition to controlling the temperature and the temperature profile during cutting and sintering, the gas ambient surrounding the soot sheet/glass sheet can also be controlled. Specifically, both the total pressure as well as the partial pressure of suitable gases can be selected in order to control the cutting and sintering process. In certain embodiments, a controlled gas mixture can comprise one or more active or inert gases such as, for example, air, He, $O_2$, CO, $N_2$, Ar or mixtures thereof.

In various embodiments, a method for making a partially-sintered soot part comprises locally-heating a portion of a soot sheet to cut the soot sheet and simultaneously forming a sintered glass edge, where the partially-sintered soot part comprises a porous soot body and the sintered glass edge.

The process and apparatus disclosed herein are suited for making soot sheets comprising a high percentage of silica, e.g., "high-silica" glass sheets. By "high-silica" is meant a composition comprising at least 50 mole % silica glass, e.g., greater than 50, 55, 60, 65, 70, 75, 80, 85, 90, 95, 98, 99, 99.5 or 99.9 mole % silica.

Porous, mechanically robust soot parts can be formed. Locally-sintered soot parts such as high-silica soot parts can have an average thickness of 50 microns to 5 mm (e.g., 50, 100, 200, 500, 1000, 2000 or 5000 microns). By controlling the thickness of the deposited soot layer and the local sintering conditions, it is possible to independently control both the sintered and non-sintered dimensions of the soot.

The process can be used to form high quality porous soot parts. The resulting glass soot parts can be characterized by a number of properties including composition, thickness, porosity, density and flatness.

According to embodiments, means for forming a soot part having a rigid or semi-rigid edge include laser sintering. Additional means for forming a rigid or semi-rigid edge that at least partially surrounds a porous soot body include other types of localized sintering such as hot knife sintering. In further embodiments, an edge-hardening substance may be applied to a portion of a soot sheet to provide local mechanical strength. Example edge-hardening substances include glazings and polymers such as curable polymers.

As used herein, "soot layer" or "layer of soot" refers to a stratum of essentially homogeneously-distributed glass particles that may be bonded with each other. The layer generally has an average total thickness that is greater than or equal to an average diameter of individual particles. Further, a soot layer may comprise a single soot layer having an essentially homogeneous composition or multiple soot layers each having an essentially homogeneous composition. In embodiments, parameters describing the gas stream such as chemical composition of the gas, gas flow rate, gas temperature, and the location of the impingement can be selected and optimized based on parameters describing the soot sheet such as soot composition, soot thickness, and the local or average soot temperature.

In embodiments where the soot layer comprises multiple layers, one species of glass particles can form a first soot layer, while a second species of glass particles can form a second soot layer adjacent to the first soot layer. Thus, respective soot layers can have distinctive compositional and/or other properties. Moreover, in an interfacial region between the first and second layers, blending of the two species of particles can occur such that the composition and/or properties at the interface of contiguous layers may deviate from the bulk values associated with each respective layer.

EXAMPLES

The invention will be further clarified by the following examples.

Example 1

Fabrication of a Single-Layer Soot Sheet

A soot layer comprising 99+ mole % silica was produced using five linear burners. The five 2.5 cm wide burners were mounted adjacently in a burner array to produce a uniform, 12.5 cm wide soot stream. Each burner included 9 parallel rows of gas orifices. The gas orifices each measure 0.075 cm in diameter.

A precursor gas mixture comprising OMCTS (5 g/min) entrained in $N_2$ (20 SLPM) was flowed through the centerline row of orifices. Oxygen gas was flowed through three adjacent rows of orifices on each side of the centerline row. The oxygen gas flow through the immediately adjacent rows was 5 SLPM, while the oxygen gas flow through the next pair of rows was 20 SLPM. The gas flow through the final (outside) orifice rows comprised a mixture of $CH_4$ (12 SLPM) and $O_2$ (10 SLPM).

The burners were positioned approximately 10 cm from the deposition surface of a cylindrical soot-receiving device. The soot-receiving device had a diameter of about 38 cm and a wall thickness of about 0.64 cm. The soot-receiving device was rotated to provide a linear surface speed of 1 mm/sec.

Soot from the burner array was directed to the deposition surface and a layer of soot approximately 200 microns thick and 15 cm wide was deposited. An average density of the center 13 cm of the soot sheet was approximately 1.1 g/cm$^3$. The 13 cm wide soot sheet created at the higher density was released from the drum, augmented by a stream of air supplied by an air knife. The air knife supplied approximately 20 SLPM of air through a 25.4 cm wide air knife body, which was directed at the deposition surface. The soot sheet was manually grabbed by the peripheral edges and directed to a wind drum. The wind drum was approximately 41 cm in diameter. Five meters of soot sheet were wound onto the drum.

Example 2

Cutting and Localized Sintering of a Single-Layer Soot Sheet

Figure 9:
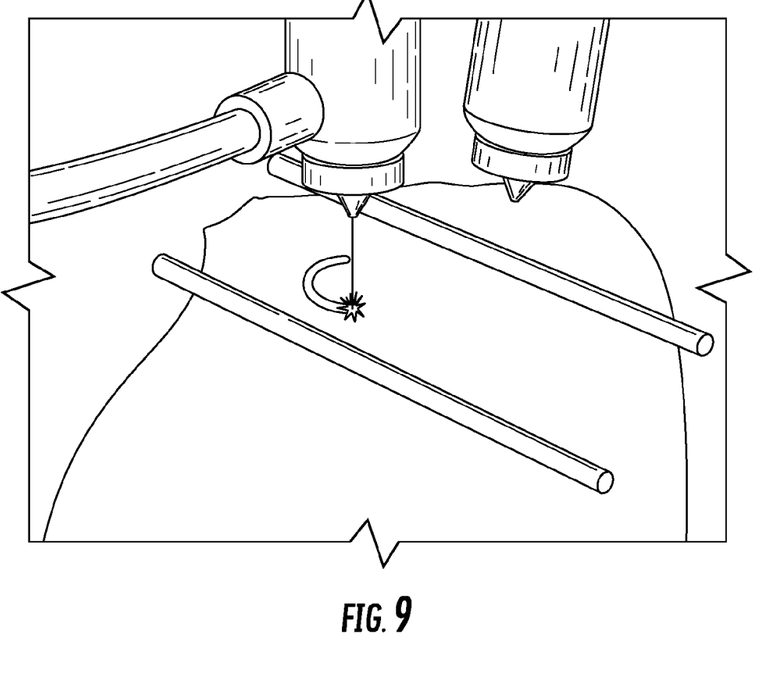
FIG. 9 is an optical micrograph showing laser cutting of a soot sheet to form a soot part.
Figure 10:
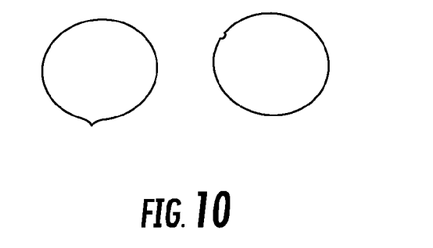
FIG. 10 is an optical micrograph of example soot parts.

With reference to the optical photographs of FIGS. 9 and 10, a $CO_2$ laser was used to cut a 400 micron thick high-silica (>99%) soot sheet into substantially circular soot parts. The width of the sintered edge was about 1 mm. The soot parts had a diameter of 16.5 mm and included a 1 mm wide sintered glass edge.

Example 3

Effect of Process Conditions on Soot Sheet Thickness and Density

A designed experiment was conducted in which the (i) rotational velocity of the soot-receiving device, (ii) distance from the burner to the deposition surface, and (iii) $O_2$ flow rate in the outermost burner columns (i.e., columns 1 and 9) were systemically varied. The effects of these variables on the thickness and density of the resulting soot sheet were measured and the data is shown in Table 3. Using the selected parameters, as seen in the tabulated data, a thickness of the soot sheet varies from about 250 to 700 microns, and a bulk density of the soot sheet varies from about 0.35 to 0.7 g/cm$^3$. Generally, the soot sheet thickness and density increase with decreasing velocity of the soot-receiving device.

TABLE 3

Effect of process conditions on soot sheet thickness and bulk density

| Run # | Velocity [mm/sec] | Burner-Deposition Surface Distance [mm] | $O_2$ [slpm] | Soot Thickness [μm] | Bulk Soot Density [g/cm$^3$] |
|---|---|---|---|---|---|
| 1 | 3 | 27.9 | 26 | 350 | 0.37 |
| 2 | 2 | 27.9 | 30 | 500 | 0.40 |
| 3 | 2 | 27.9 | 22 | 420 | 0.47 |
| 4 | 1 | 27.9 | 26 | 610 | 0.62 |
| 5 | 2 | 32.3 | 26 | 370 | 0.52 |
| 6 | 1 | 32.3 | 22 | 690 | 0.65 |
| 7 | 1 | 36.7 | 26 | 660 | 0.62 |
| 8 | 2 | 32.3 | 26 | 400 | 0.55 |
| 9 | 2 | 32.3 | 26 | 370 | 0.53 |
| 10 | 3 | 32.3 | 22 | 240 | 0.50 |
| 11 | 2 | 36.7 | 22 | 420 | 0.42 |
| 12 | 1 | 32.3 | 30 | 640 | 0.68 |
| 13 | 2 | 36.7 | 26 | 360 | 0.49 |
| 14 | 3 | 36.7 | 26 | 300 | 0.40 |
| 15 | 3 | 32.3 | 30 | 290 | 0.44 |
| 16 | 2 | 36.7 | 30 | 390 | 0.45 |
| 17 | 2 | 32.3 | 26 | 400 | 0.51 |

Example 4

Multi-Component Glass Sheets

Multi-component glass sheets having binary ($SiO_2/TiO_2$) and ternary ($SiO_2/TiO_2/P_2O_5$) compositions were made by introducing titanium and optionally phosphorus precursors into the OMCTS flow. Compositions of the resulting multi-component high-silica glass sheets, expressed in percent by weight of the respective components, are disclosed in Table 4. In the Table 4 data, the silica content was determined by gravimetry while the titanium and phosphorus content(s) were determined by inductively coupled plasma/direct coupled plasma (ICP/DCP). As a result of using different measurement techniques, the compositions of the respective components may not total 100 wt. %.

TABLE 4

Compositions of multi-component high-silica glass sheets

| Run # | $SiO_2$ [wt. %] | $TiO_2$ [wt. %] | $P_2O_5$ [wt. %] |
|---|---|---|---|
| 50 | 94.1 | 4.46 | 0.1 |
| 51 | 93.4 | 5.02 | 0 |

As used herein, the singular forms "a," "an" and "the" include plural referents unless the context clearly dictates otherwise. Thus, for example, reference to a "sintered region" includes examples having two or more such "sintered regions" unless the context clearly indicates otherwise.

Ranges can be expressed herein as from "about" one particular value, and/or to "about" another particular value.

When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a soot sheet that comprises sintered and unsintered glass soot particles include embodiments where a soot sheet consists of sintered and unsintered glass soot particles and embodiments where a soot sheet consists essentially of sintered and unsintered glass soot particles.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A partially-sintered soot part of at least 50 mole percent silica glass comprising:
   a porous soot body, and
   a peripheral sintered glass edge of sintered soot surrounding the porous soot body, wherein the glass edge width ranges from 0.5 to 5 mm, and wherein density of the sintered soot across the glass edge decreases proximate to the porous soot body.

2. The partially-sintered soot part of claim 1, wherein the porous soot body density ranges from 0.2 to 1.76 $g/cm^3$ and the glass edge density ranges from 1.76 to 2.2 $g/cm^3$.

3. The partially-sintered soot part of claim 1, wherein the porous soot body is from 10 to 80% dense and the glass edge is at least 80% dense.

4. The partially-sintered soot part of claim 1, wherein the glass edge is at least 80% dense.

5. The partially-sintered soot part of claim 1, wherein the glass edge is at least 95% dense.

6. The partially-sintered soot part of claim 1, wherein the porous soot body thickness ranges from 50 microns to 5 mm.

7. The partially-sintered soot part of claim 1, wherein the porous soot body composition and the glass edge of sintered soot composition are the same as one another.

8. The partially-sintered soot part of claim 1, wherein the porous soot body comprises a composite of at least two soot layers.

9. The partially-sintered soot part of claim 1, further comprising a sintered glass region formed within the porous soot body.

10. The partially-sintered soot part of claim 1, further comprising an inner sintered glass edge.

11. The partially-sintered soot part of claim 1, where the peripheral sintered glass edge of sintered soot is semi-rigid.

* * * * *